Aug. 12, 1969 J. BOOKMAN 3,461,228

TELEPROMPTING SYSTEM UTILIZING SHORT RANGE TRANSMISSION TV

Filed April 18, 1968

INVENTOR.
JACK BOOKMAN

BY Kenneth J. Goldfarb

ATTORNEY.

United States Patent Office 3,461,228
Patented Aug. 12, 1969

3,461,228

TELEPROMPTING SYSTEM UTILIZING SHORT RANGE TRANSMISSION TV

Jack Bookman, 38 Cypress Lane, Orangeburg, N.Y. 10962

Filed Apr. 18, 1968, Ser. No. 722,229
Int. Cl. H04n 7/18, 7/02
U.S. Cl. 178—6 4 Claims

ABSTRACT OF THE DISCLOSURE

A prompting device comprising an information screen with a video camera focused on said screen which has a prepared script in the screen and means for movably mounting the prepared script in the information screen past the video camera. A slide holding means mounted in front of the screen with the prepared script being visible through the slide holding means so that when necessary a slide can be inserted in the slide holding means between said camera and said prepared script, so as to immediately transmit the information contained on the slide to all of the prompting devices.

The present invention relates generally to prompting devices and the like, and more particularly to novel means for prompting performers and others with respect to their script wherein changes and corrections can be made instantaneously by remote control.

In the advanced state of the television broadcasting art the use of prompting machines and the like have become necessary due to the fact that scripts often change after the start of a program such as in news and current events programs. In addition, actors, actresses and other performers can not be expected to commit to memory all of their lines for serial type or weekly programs where there is insufficient time for memorization. Further, certain television shows such as news broadcasts and the like are not susceptible to prepared scripts in that news is constantly occurring and often late breaking news items occur which drastically alter the prepared scripts. In order to provide for a smooth presentation of up to date news or the like, it is preferable not to have a messenger run on stage in view of the camera and the home audience, and hand the newscaster the late news bulletin.

The technique for running a television program as known today generally comprises using a plurality of television cameras located about the studio which cameras are focused on the actors and take and broadcast pictures to the transmitters or taping stations for instantaneous or subsequent broadcast of the television program.

The camera crews including the sound boom operators are directed by the program director by telephone as to what locations the cameras should be placed in or exactly how he wants the scene photographed. The actors must generally memorize the script as well as the locations which they must assume on stage.

With respect to news broadcasts and the like, news commentators have been required to read from scripts which are hand held in front of them as are notes, however, this procedure is generally considered inacceptable in that it requires the commentator to look at the script before him, instead of at the camera and the viewers.

To remedy this obvious disadvantage, prompting means were developed wherein the entire script was placed on a long roll of paper which was then placed in a viewing box which was affixed to each camera so that the commentator could read the script while apparently looking directly at the camera. When more than one camera is employed this same script had to be placed on a number of cameras and synchronizing means had to be employed so as to insure that the script was advanced uniformly on each prompting device on each camera. Further, the speed of advance of the script had to be geared to the particular speed patterns of the commentator which required elaborate synchronization equipment. When utilizing this type of equipment, it is exceptionally difficult to add or delete portions of the script once the script has been placed on the cameras since the entire script is on a single roll and to make an insert would require stopping the script on all cameras and making corrections on each script. Further, the present systems have no provisions for corrections or updating as may be necessary. In particular, if the director notices that the program is running slow or behind schedule, he is unable to so notify a performer except by waving his hands or some other similar method.

Accordingly, it is an object of this invention to provide a prompting system wherein complete flexability in programming can be achieved.

Further it is an object of the present invention to provide a prompting system wherein each prompter will display the identical sequence at all times wherein synchronization equipment is totally eliminated.

Further, it is an object of the present invention to provide a prompting system which eliminates the necessity for cumbersome wiring and cables being attached to each camera.

A further object of the present invention is to provide a prompting system wherein no special printers' typing systems, or paper is required so as to place the script before the performer.

Still further, it is an object of the invention to provide a prompting system wherein corrections in copy or emergency instructions and/or bulletins can be flashed to performers and others concerned with the production of a show while a show is in progress without being disruptive to the prompting system.

A further object of the present invention is to provide a prompting system capable of notifying the performers and all other interested persons who are not on stage of who must be made aware of certain information without the need for additional personnel.

Still further, it is an object of the present invention to provide a prompting system which could be placed on a desk for lecturn immediately under the eyes of a performer or speaker the operation of which would not interfere with the ultra-sensitive audio pick-up equipment commonly in use.

Further, it is an object of the invention to provide a prompting system which is more efficient than known prompting systems and which will be far less expensive to purchase and operate than existing systems.

Still further, it is an object of the invention to provide a prompting system which will reduce the number of personnel necessary for the production of a program thereby effecting a cost reduction based on reduction of labor.

These, together with various further and ancillary objects, features and advantages of the present invention will become more apparent in the foregoing specification, description and drawings in which.

Figure 1:
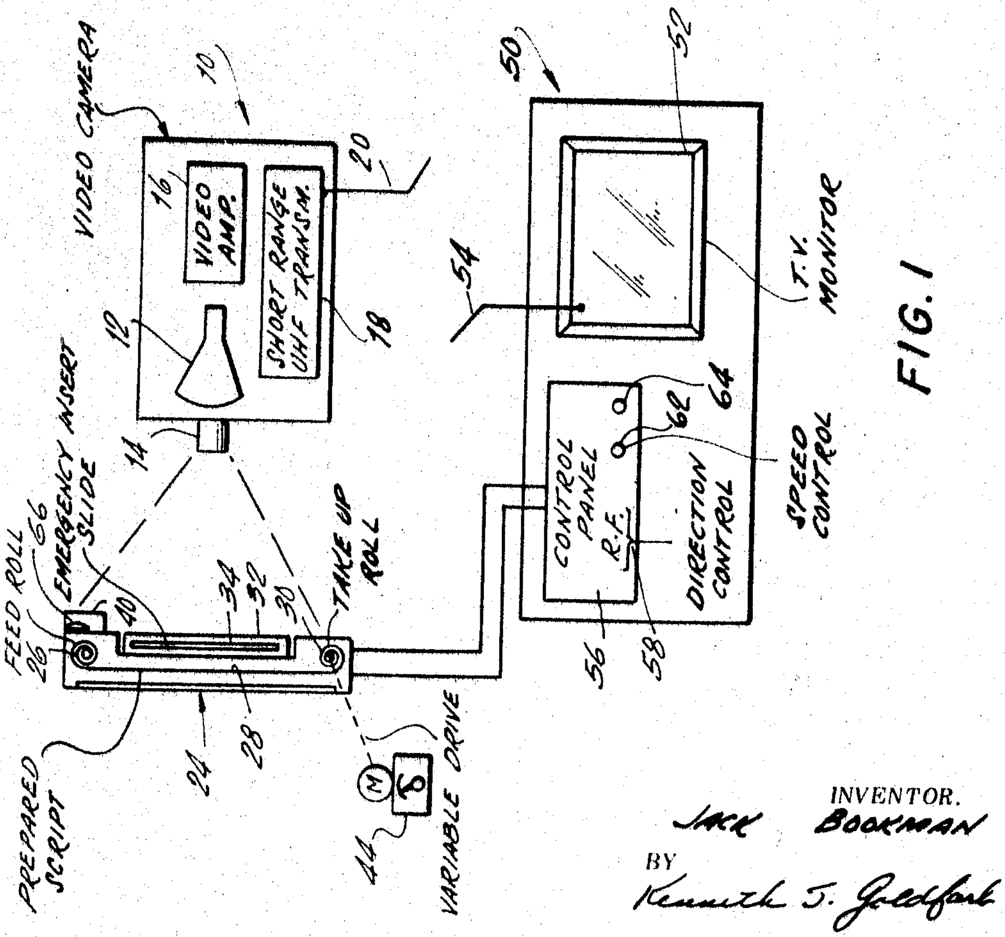
FIG. 1 is a block diagram of a closed circuit video prompting system according to the invention.

Referring now specifically to FIG. 1, there is seen a video or television camera generally designated as 10 which camera is provided with a scanning tube 12 mounted behind a lens 14. The scanning tube 12 is connected to a video amplifier 16 of known construction which video amplification circuit is connected to a short range ultra-high frequency transmitter provided with a sending antenna 20.

It is to be understood that while in the illustrative embodiment illustrated in the drawings herein a U.H.F. transmission system is illustrated, it is fully within the concept of the present invention to provide a system which will accomplish the exact same purposes utilizing cable transmission in lieu of the U.H.F. transmission.

Video camera 10 has the lens 14 thereof prefocused upon an information screen generally designated at 24 wherein the prepared text or script is placed about feed roll 26 at the upper portion of the information screen connected by a leader 28 to a take-up roll 30 at the lower end of the information screen 24.

An emergency slide holder or carrier 32 is positioned centrally between the feed roll 26 and the take-up roll 30 which slide insert has an opening 34 formed at the sides thereof through which cards containing emergency information can be inserted.

The emergency insert slide holder 32 is provided with top, bottom and side frames through which the lens 14 of the video camera 10 will focus so as to pick-up the information from the prepared script coming from the feed roller 26 at such times when there is no emergency information inserted in emergency slide holder 32.

The lens 14 of the video camera has sufficient wide angle properties so as to encompass within the field of vision of the lens 14 the digital clock timing mechanism 40 which is mounted adjacent the upper edge of said information screen 24.

Connected to the take-up roller 30 are drive means (not shown) which consist of a motor M connected thereto by suitable drive means (not shown). A variable spaced drive control 44 shown as a rheostat 44 is connected to the motor M which serves to control the speed of the motor M.

A console control unit generally designated as 50 is placed at a remote location from the prompting camera 10 and the information screen 24 at which console a program director is positioned. The console 50 contains a video monitor 52 provided with a receiving antenna 54 or other suitable means for picking up the video signals generated by the video camera 10. The video monitor 52 will pick-up the picture emanating from the camera 10 and may be adopted for a split screen image so as also to present a picture which is being transmitted by the performer's camera 60 (FIG. 3) or in the alternative, the console 50 may be provided with a plurality of monitors with at least one monitor programmed to receive signals from the video camera 10 and with other monitors adapted to display information to the performer.

The console 50 is further provided with a control panel 56 which has provided thereupon a motor direction control apparatus 58 for selectively advancing or reversing the direction of the motor M and the roll 24 so as to properly advance the prepared script 28. The control panel 56 is likewise provided with a speed control mechanism 62 which enables the program director to speed up or slow down the rate of the advancement of the prepared script 28. Further, a warning light control 64 is also provided on the console wherein the program director may actuate a warning light 66 on the information screen 24 so as to alert the performer as to the time remaining in the event the performer has not been paying close attention to the digital timer 40 located on the information screen 24 which is displayed on the monitor screen 76.

By utilizing the speed control mechanism 62 it is possible for the program director to speed up or retard the rate of advancement of the prepared script 28 thereby compelling the performer to adjust his rate of delivery, likewise, should the performer be advancing too rapidly, the director can slow down the advancement of the script 28 thereby stretching the amount the performer will utilize to deliver a specific text, message or statement.

As referred to above, there is provided in the information screen 24 an emergency slide insert 34 into which a news bulletin or the like can be inserted for delivery by the performer without in any wise having to damage, splice or in any other manner alter the prepared script 28.

Figure 3:
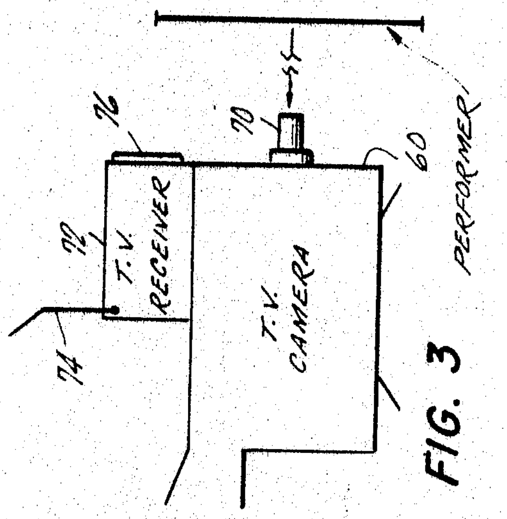
FIG. 3 is a schematic elevational view depicting a television camera with a promptiing device mounted thereupon.
Figure 2:
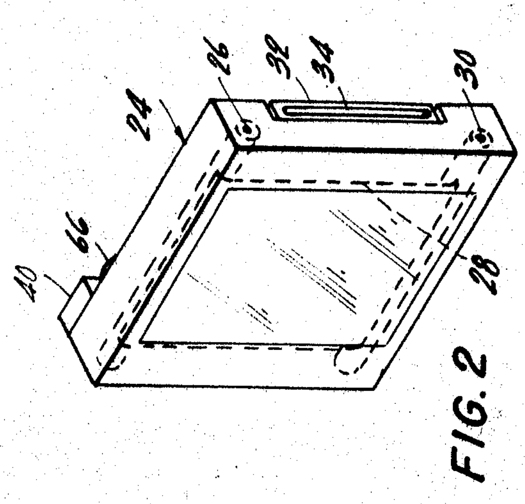
FIG. 2 is a perspective view of the video information screen and timing mechanism of the present invention.

Referring now to FIG. 3, there is seen a television video camera generally designated as 60 having a lens 70 thereupon, which lens is focused on the performer or performers as the case may be. Positioned directly above and facing the performer or performers is a TV video receiver 72 which is provided with a receiving antenna 74 or other connection means for receiving the video picture transmitted by video camera 10.

It is to be noted that the viewing screen 76 of the receiver 72 is positioned facing the performer or performers as can be readily seen so that the scripts are visible to the performers while they are looking at the lens 70 of the camera 60.

It is to be understood that various and other further embodiments of the present invention such as the use of electronic signals to speed up or slow down the performance and that any emergency inserts placed into the information screen 24 will be simultaneously seen by all performers on the stage.

While a preferred embodiment of the present invention has been shown and described, it is obvious that many variations and modifications which would be obvious to one skilled in the art and accordingly, in the light of the above teaching the concepts of the present invention are defined in the claims.

A latitude of modification, substitution and change is intended in the foregoing disclosure and in some instances, some features of the invention will be employed without a corresponding use of their features. Accordingly, it is appropriate that the appended claims be construed broadly and in a manner consistent with the spirit and scope of the invention herein.

I claim:

1. A prompting device comprising an information screen, a wireless transmission video camera focused directly on said screen, a prepared script, means for movably mounting said prepared script on said information screen, slide holding means mounted on said screen with said prepared script being visible through said slide holding means so that a slide can be interposed in said slide holding means between said camera and said prepared script wherein said means for movably mounting said prepared script on said information screen includes variable speed motor drive means operatively connected to said prepared script for moving said prepared script at a variable rate of speed past said information screen, a control console remote from said information screen, a wireless video monitor on said console for receiving signals from said wireless transmission video camera, at least one wireless video receiver means remote from said console and said wireless camera receiving said signals from said camera for observation by a performer, and control means on said console for controlling information on said information screen and further controlling the speed of operation of said drive means so that said receiver means receive controlled rate information from said information screen.

2. A prompting device according to claim 1, including television transmitter means for observing the performer, said monitor being associated with said television transmitter means.

3. A prompting device as set forth in claim 2, wherein said information screen is provided with digital timing means thereupon, said digital timing means being positioned within the field of vision of said video camera, said digital timing means being visible on said monitors and said receiver means.

4. A prompting device as set forth in claim 3, wherei said information screen is provided with light signallin means, and signal light control means on said consol for controlling said signal light means on said informa tion screen.

References Cited

UNITED STATES PATENTS

| | | | |
|---|---|---|---|
| 2,475,641 | 7/1949 | Rosenberg. | |
| 2,598,947 | 6/1952 | Thielen. | |
| 2,829,196 | 4/1958 | Claffey. | |
| 2,934,601 | 4/1960 | Oppenheimer | 178—6. |
| 2,986,596 | 5/1961 | Hammond. | |

ROBERT L. GRIFFIN, Primary Examiner

ROBERT L. RICHARDSON, Assistant Examiner

U.S. Cl. X.R.

178—5, 7; 352—4